United States Patent
Seekell

(10) Patent No.: US 10,763,648 B2
(45) Date of Patent: Sep. 1, 2020

(54) ARM ROLLER FOR STRINGING DISTRIBUTION CONDUCTORS

(71) Applicant: Robert Seekell, Kuna, ID (US)

(72) Inventor: Robert Seekell, Kuna, ID (US)

( * ) Notice: Subject to any disclaimer, the term of this patent is extended or adjusted under 35 U.S.C. 154(b) by 0 days.

(21) Appl. No.: 16/824,248

(22) Filed: Mar. 19, 2020

(65) Prior Publication Data

US 2020/0220338 A1    Jul. 9, 2020

Related U.S. Application Data

(63) Continuation-in-part of application No. 16/595,447, filed on Oct. 7, 2019, now abandoned, which is a continuation-in-part of application No. 16/719,800, filed on Dec. 18, 2019.

(51) Int. Cl.
*H02G 1/02*        (2006.01)

(52) U.S. Cl.
CPC ..................... *H02G 1/02* (2013.01)

(58) Field of Classification Search
CPC .. H02G 1/00; H02G 1/02; H02G 1/06; H02G 1/16; H02G 7/00
See application file for complete search history.

(56) References Cited

U.S. PATENT DOCUMENTS

| | | | | |
|---|---|---|---|---|
| 3,032,320 A | * | 5/1962 | Peterson | B63B 35/06 254/134.3 R |
| 3,863,897 A | * | 2/1975 | Yeager | H02G 1/04 254/134.3 R |
| 3,912,226 A | * | 10/1975 | Jackson | H02G 1/04 254/134.3 PA |
| 2009/0078921 A1 | * | 3/2009 | Plummer | H02G 1/08 254/134.3 FT |
| 2014/0131645 A1 | * | 5/2014 | Jordan | H02G 1/06 254/134.3 R |
| 2016/0141848 A1 | * | 5/2016 | Boisclair | F16L 3/08 254/134.3 PA |
| 2020/0220338 A1 | * | 7/2020 | Seekell | H02G 1/02 |

* cited by examiner

*Primary Examiner* — Lee D Wilson
(74) *Attorney, Agent, or Firm* — Shaver & Swanson, LLP; Scott D. Swanson

(57) ABSTRACT

An aggregation roller for extending a conductor over a span for electrical distribution. The aggregation roller is useful providing safety for linemen, adaptability to new technologies for conductors, low friction to easily pull the conductors and durability. The aggregation roller is useful in reducing the chances of electrocution of the lineman when the aggregation roller is near energized conductors. Further, the aggregation roller replaces multiple rollers as is used today.

12 Claims, 7 Drawing Sheets

ARM ROLLER FOR STRINGING DISTRIBUTION CONDUCTORS

PRIORITY/CROSS-REFERENCE TO RELATED APPLICATIONS

This application claims the benefit of U.S. Non-Provisional application Ser. No. 16/595,447, filed Oct. 7, 2019 and U.S. Non-Provisional application Ser. No. 16/719,800, filed Dec. 18, 2019, the disclosures of which are incorporated by reference.

TECHNICAL FIELD

This invention relates to electrical power distribution. More particularly, it relates to stringing conductors for electrical power distribution.

BACKGROUND

Electric power distribution is the final stage in the delivery of electric power; it carries electricity from the transmission system to individual consumers. Distribution substations connect to the transmission system and lower the transmission voltage to medium voltage ranging between 2 kV and 35 kV with the use of transformers.

Primary distribution lines carry this medium voltage power to distribution transformers located near the customer's premises. Distribution transformers again lower the voltage to the utilization voltage used by lighting, industrial equipment or household appliances.

Often several customers are supplied from one transformer through secondary distribution lines. Commercial and residential customers are connected to the secondary distribution lines through service drops.

The transition from transmission to distribution happens in a power substation, which has the following functions:

(1): Circuit breakers and switches enable the substation to be disconnected from the transmission grid or for distribution lines to be disconnected.

(2): Transformers step down transmission voltages, 35 kV or more, down to primary distribution voltages. These are medium voltage circuits, usually 600-35,000 V.

(3): From the transformer, power goes to the busbar that can split the distribution power off in multiple directions. The bus distributes power to distribution lines, which fan out to customers.

Urban distribution can be done underground or overhead. Rural distribution is mostly above ground with utility poles, and suburban distribution is a mix. Closer to the customer, a distribution transformer steps the primary distribution power down to a low-voltage secondary circuit, usually 120/240 V in the US for residential customers. The power comes to the customer via a service drop and an electricity meter. The final circuit in an urban system may be less than 50 feet (15 m), but may be over 300 feet (91 m) feet for a rural customer.

Electricity is delivered at a frequency of either 50 or 60 Hz, depending on the region. It is delivered to domestic customers as single-phase electric power. In some countries as in Europe a three-phase supply may be made available for larger properties. Seen with an oscilloscope, the domestic power supply in North America would look like a sine wave, oscillating between −170 volts and 170 volts, giving an effective voltage of 120 volts RMS. Three-phase power is more efficient in terms of power delivered per cable used, and is more suited to running large electric motors. Some large European appliances may be powered by three-phase power, such as electric stoves and clothes dryers.

A ground connection is normally provided for the customer's system as well as for the equipment owned by the utility. The purpose of connecting the customer's system to ground is to limit the voltage that may develop if high voltage conductors fall down onto lower-voltage conductors which are usually mounted lower to the ground, or if a failure occurs within a distribution transformer. Earthing systems can be TT, TN-S, TN-C-S or TN-C.

When a new conductor is introduced into the electrical distribution system, whether it be transmission, sub transmission or distribution, there is a need to run the wires from structure to structure. The structures can be wood poles, metal poles, lattice towers or fiberglass poles. Most often on main distribution lines, the structure will have four (4) conductors on each pole and sometimes double circuits that could be eight (8) or more conductors. The wires or conductor might run one to four (1-4) miles in town or about forty (40) poles per mile. Each conductor needs a roller to install In town distribution poles have an average spacing of about 132 feet. Line workers install rollers on top of a crossarm or utility arm or hang under an insulator to pull in rope that pulls in the new conductor. The term roller as used herein is used to define blocks with single rollers (such as those that have the appearance of a pulley as well as the inventor's SAR which has a series of rollers as opposed to a single pulley). When there are existing energized conductors on the crossarm or utility arm, line workers have to move the conductors while they are energized to fiberglass temp arms that attach to existing crossarm or utility arms. The reason for this step is to make room to install the rollers to the crossarm or utility arm to pull in the conductor, without having to de-energize the lines and thus cutting power to the end user(s).

The rollers that are used today are typically aluminum construction, which is a conductive material. When the line workers are installing, they are very close to energized existing conductors. There have been many cases in the US where the line workers are injured due to contact with energized parts in their work zone. If the angle needs to be corrected after stringing operation starts the worker needs to remove the conductor, correct the angle on the roller and then reinstall the conductor in the roller.

Further, the typical prior art rollers for use around energized lines use a single full circle pulley. The pulley provides a support area for a transmission or distribution line that has a small bending radius that can damage the inner core of the conductors with two small of a radius that new age carbon core conductors will break. This causes the line to droop or bow between rollers, and can lead to the breakage of the line. Similarly when line workers utilize a spacer cart the rollers of many spacer carts typically are separate single, full rollers. This again creates too steep of a radius and stress point, potentially leading to conductor line breakage. This is particularly troublesome with newer conductor materials. Lineman cannot install large diameter rollers on top of a cross arm because of tight quarters, energized conductors in reach, and large rollers are not generally designed to mount to utility cross arms.

In light of the foregoing, there is a need for an improved roller that allows for safe installation and helps the overloaded electrical grids in the United States by effectively installing carbon core conductors in the distribution circuits. What is further needed is an improved roller that is preferably at least partially non-conductive, preferably allows for a variety of mounting angles, and is lightweight and ergonomic to facilitate installation and removal.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

In accordance with the present invention is an aggregation roller for stringing a conductor over a span. The aggregation roller has a main body with a first side, a second side and a bottom side. The bottom side is generally flat, and the main body has a generally arcuate shape. The main body can be made of carbon fiber, aluminum, cast, polyvinyl chloride (PVC), etc. The aggregation roller has an interior with a plurality of rollers attached to the first side and the second side. The rollers are positioned in the interior in an arcuate shape and configured to each rotate when a line is pulled or pushed over a center of the rollers. The rollers are preferably cylindrical in shape. The number of rollers are preferably six (6), however other numbers of rollers are hereby contemplated, including but not limited to, three (3), four (4), five (5), seven (7), eight (8), etc, depending on the task and conductor size. Alternatively, the rollers can be bearings configured to roll a conductor. The first side, the second side, and the rollers preferably form a groove for a conductor.

In a preferred embodiment, an extension arm extends generally vertically from the second side of the main body. A gate attaches to the extension arm. The gate can be made of carbon fiber, plastic, etc. The gate is configured to open when pressure from a conductor or pulling line is applied to the gate. The gate is configured to close when the pressure from the conductor is relieved. In one embodiment, the gate can be spring-loaded.

In another embodiment, first flange attaches to the bottom side of the main body. The first flange is configured for mating engagement with a flange of a base (illustrated in U.S. patent application Ser. Nos. 16/595,447 and 16/719, 800).

In another embodiment, a second flange attaches to the second side of the main body. The second flange is configured for mating engagement with a flange of a base (illustrated in U.S. patent application Ser. Nos. 16/595,447 and 16/719,800).

In another embodiment, the main body is made of UHMW non-conductive material or other non-conductive material.

In another embodiment, a helicopter guide arm attaches to the first side of the main body. The helicopter guide arm preferably attaches by helicopter guide channels in the first side of the main body. Alternatively, the helicopter guide arm can attach by other constructions known in the art. The helicopter guide channel can comprise to spaced apart tubular structures into which tubular male extension of a helicopter arm are positioned in mating engagement. The helicopter guide arm is configured for a helicopter, drone, or crane to attach and position the aggregation roller. The helicopter guide arm is preferably a non-conductive material, such as fiberglass, carbon fiber material coated with a non-conductive material, cast, molded aluminum, or coated nonconductive material.

In another embodiment, the extension arm defines a rigging hole configured for a hanging application.

The aggregation roller allows for companies to double the ampacity on their circuits safely. The aggregation roller can be installed in tight quarters by drone stringing operations in the distribution or transmission circuits.

In another embodiment, the roller has an main body and an outer body. The outer body is configured for enveloping the main body's exterior either partially or entirely. The outer body is constructed of a nonconductive material, allowing a worker to utilize the roller in an energized zone. The outer body can be a single molded piece enveloping the main body or can be multiple pieces constructed to envelop the main body. The main body can be a single molded piece or can be constructed in by sections. The main body can be a conductive material. The helicopter guide channels and the first and second flange can attach to the outer body or can be integrated with the main body and extend through openings in the outer body. The flanges and helicopter guide arms can be coated with a nonconductive material.

In another embodiment, the plurality of rollers are made of a urethane or aluminum material to protect the conductor.

In another embodiment, the plurality of rollers are made of a urethane material and coated with a non-conductive polyurethane.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE EXEMPLARY EMBODIMENTS

Figure 1:
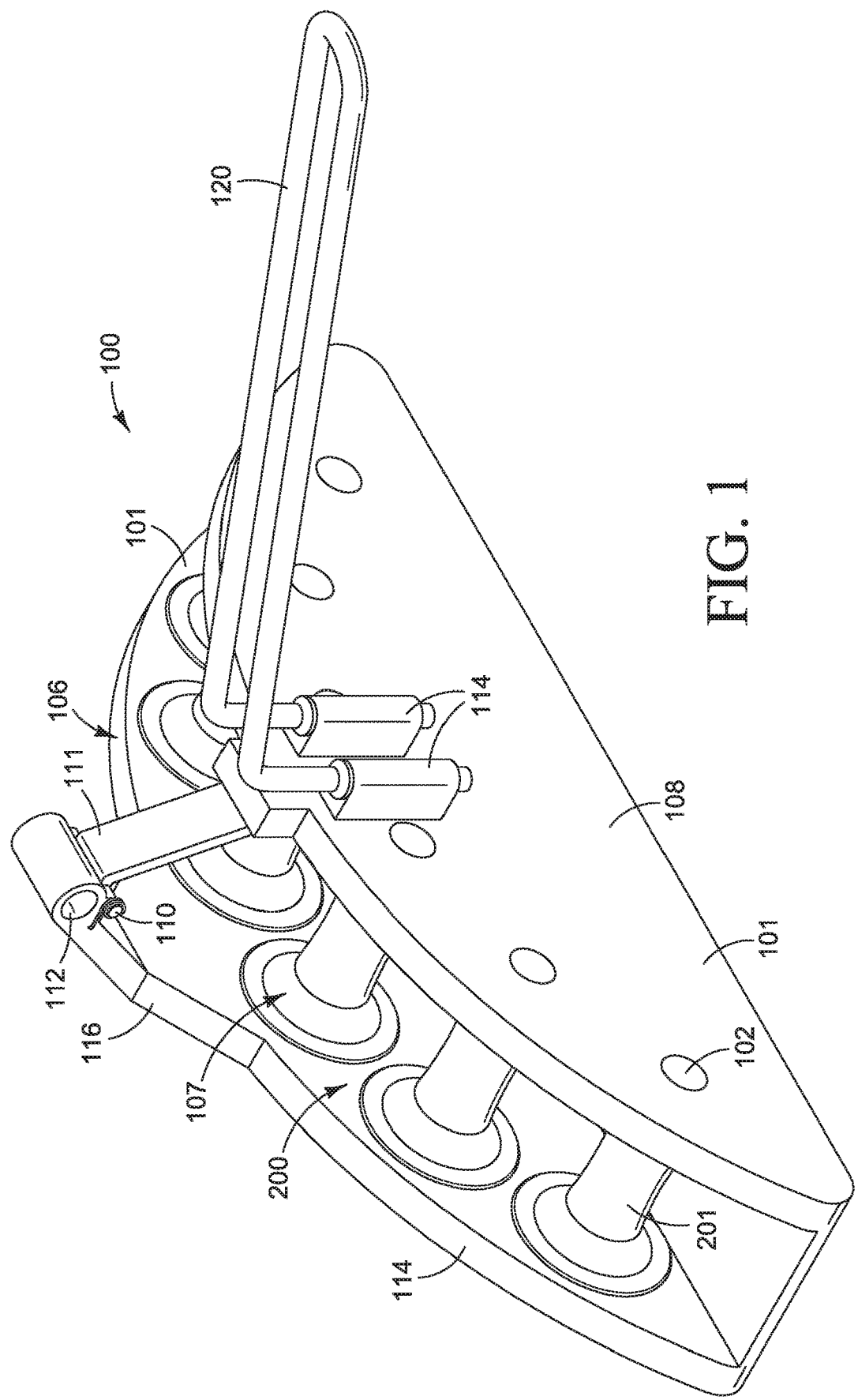
FIG. 1 is a top perspective view of an embodiment of an aggregation roller.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Embodiments of the inventive concepts disclosed herein can be used to adjust the angle while the conductor is installed making the task safer for the worker. The current invention can be utilized with electrical line or other utility lines including, but not limited to fiber optic lines. Any line that can be run through the roller to provide electricity or conduct a signal is referred herein as a "utility line."

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 2:
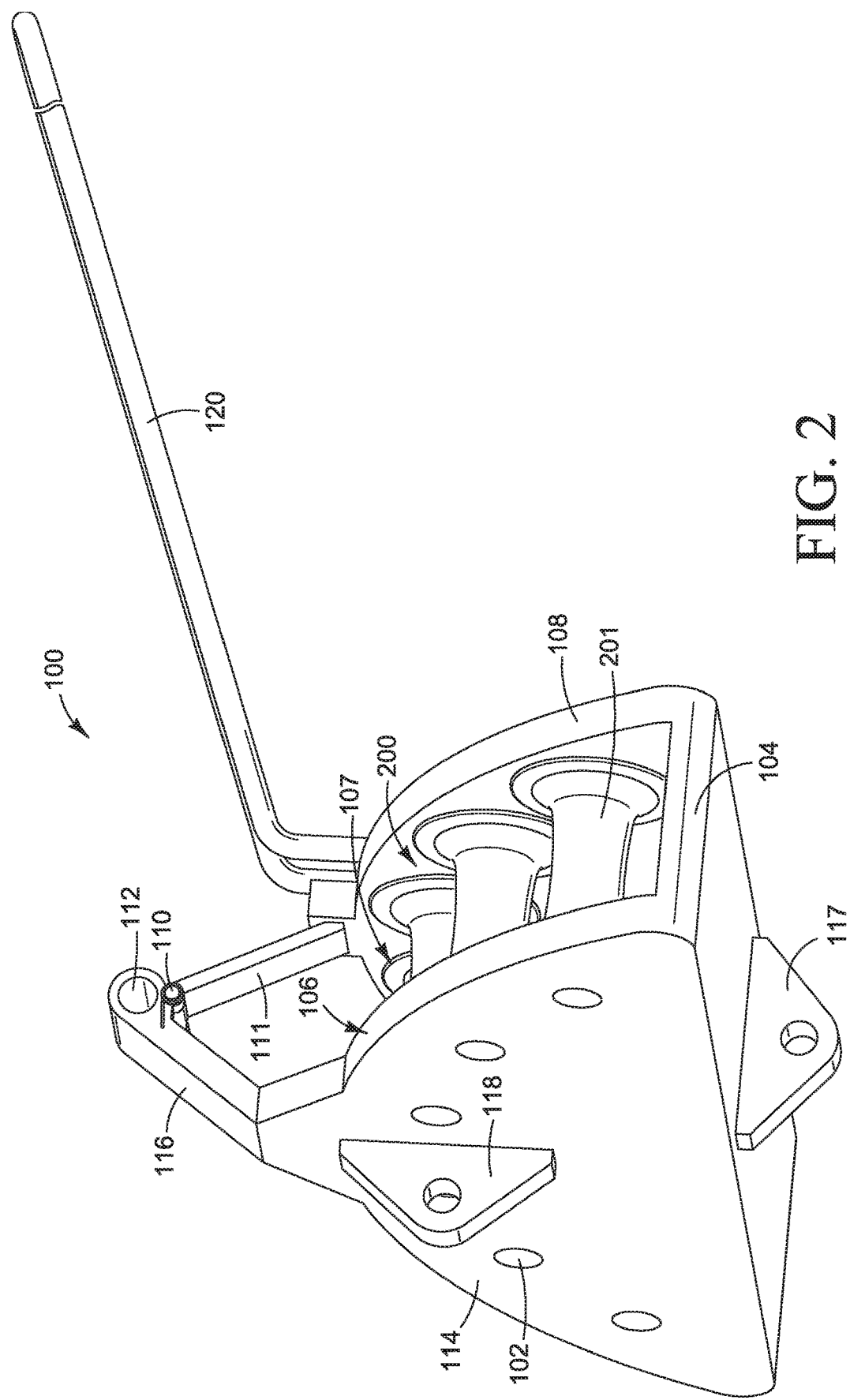
FIG. 2 is side perspective view of an embodiment of the aggregation roller shown in FIG. 1.
Figure 3:
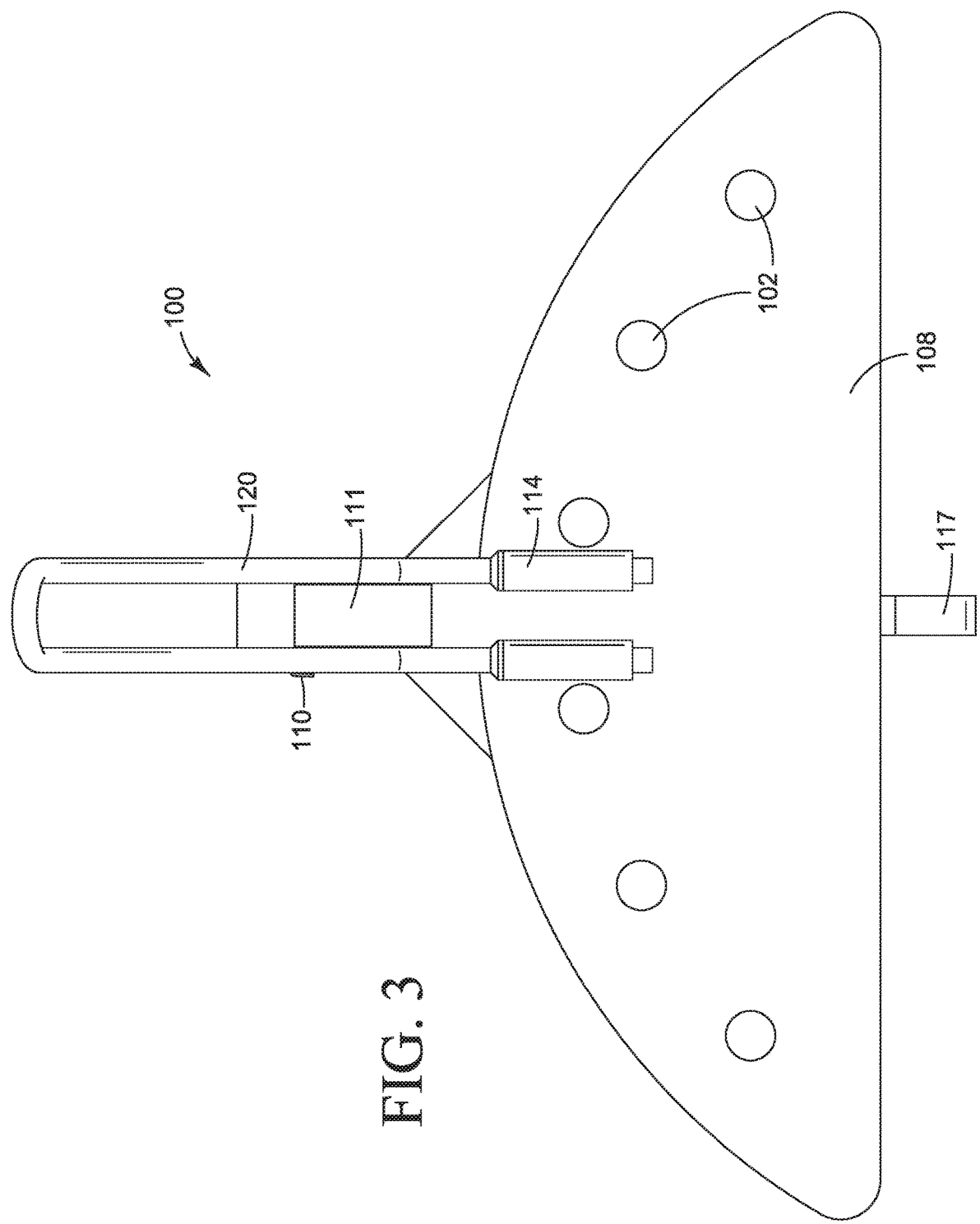
FIG. 3 is a side view of an embodiment of the aggregation roller shown in FIG. 1.

Referring to FIGS. 1-3, is an illustrated view of an exemplary aggregation roller 100 for extending a conductor over a span for electrical distribution. The aggregation roller 100 is useful providing safety for linemen, adaptability to new technologies for conductors, low friction to easily pull the conductors and durability. The aggregation roller 100 is useful in reducing the chances of electrocution of the lineman when the aggregation roller 100 is near energized conductors. Further, the aggregation roller 100 replaces multiple rollers as is used today.

The aggregation roller 100 has a main body 101, and an interior 200. The aggregation roller 100 is preferably an arcuate shape. The main body 101 defines generally a U-shape.

The interior 200 of the aggregation roller 100 has the plurality of rollers 201. The rollers are positioned in the interior 200 in an arcuate shape.

The plurality of rollers 201 of the interior 200 are securely and movably coupled to the first coupling devices 102. The plurality of rollers 201 are preferably made of an urethane material, however other materials are hereby contemplated, including, but not limited to, carbon fiber, aluminum, etc. The rollers 201 are further covered preferably with a nonconductive polyurethane. The rollers 201 are preferably cylindrical shaped. There number of rollers 201 are preferably six (6), however other numbers of rollers are hereby contemplated, including, but not limited to three (3), four (4), five (5), seven (7), eight (8) etc. Alternatively, the plurality of rollers can be integrally attached to a frame attached to the first side of the main body and the second side of the main body (as disclosed in U.S. patent application Ser. No. 16/595,447). A plurality of secondary couplings can be configured to attach the frame to the first side and second side of the main body.

Each of the rollers 201 can be rollers such as ball bearings. The ball bearings are preferably a non-greased ball bearing. however other ball-bearings are hereby contemplated, including, but not limited to, greased, etc. The non-greased ball bearings are configured for allowing the rollers 201 to have less friction and thus a smoother roll and less resistance when pulling the conductor through the interior 200 of the aggregation roller 100.

The aggregation roller 100 preferably has a height of ten and three-fourths (10.75) inches, however other heights are hereby contemplated, including, but not limited to, ten (10) inches, eleven (11) inches, etc. The aggregation roller 100 preferably has a length of seventeen and one-fourth (17.25) inches, however other lengths are hereby contemplated, including, but not limited to, sixteen and one-half (16.5) inches, eighteen (18) inches, etc, depending on the conductors minimum bend radius. A bottom 105 of the aggregation roller 100 preferably has a width of four (4) inches, however other widths are hereby contemplated, including but not limited to, three (3) inches, five (5) inches, etc. A top 106 of the main body 101 of the aggregation roller 100 preferably has a width of two (2) inches, however other widths are hereby contemplated, including, but not limited to, one and three-fourths (1.75) inches, three (3) inches, etc. The plurality of rollers 201 of the aggregation roller 100 forms a groove 107 near the top 106 of the main body 101. The groove 107 is useful for providing a finite area for a conductor to be securely and removably coupled to the aggregation roller 100.

A first side 108 of the main body 101 of the aggregation roller 100 has a plurality of first coupling devices 102. The top 106 of the aggregation roller 100 has extension arm 116 attached to a gate 111. The gate 111 is preferably a spring-loaded gate, however other types of gates are hereby contemplated, including, but not limited to, handled gate, hinged gate, etc. The extension arm 116 has a rigging hole 112 attached above, such that rigging hole 112 allows for hanging applications of the aggregation roller 100. The rigging hole 112 is preferably a size of three-fourths (0.75) inches, however other sizes are hereby contemplated, including, but not limited to, one-half (0.5) inches, one (1) inch, etc.

Further, the gate 111 is configured to be biased to a closed position. In a preferred embodiment the gate has a biasing mechanism 110 to close the gate. The biasing mechanism depicted is a torsion spring.

In practice a stringing lead rope is positioned on the gate, preferably from a helicopter. This lead is positioned on the gate, causing the gate to open under force of the lead rope pressing against the gate. The helicopter arm 120 is positioned to guide the lead onto the roller 100 typically utilizing gravity to cause the guide to slide down the helicopter arm and into the channel or depression created by the series of rollers. In an optional embodiment a lip or other transition can be positioned between the helicopter arm and the roller, preferably on the main body or outer body (or both) to prevent the lead from becoming stuck between the rollers and the main body or the helicopter arm and the outer body. The conductor is then pulled through the series of rollers, and subsequently mounted in place on the arms or pole. The gate 110 can be secured in place by a cotter pin (not shown) or any other device that can secure the positioning of the gate 110.

Figure 7:
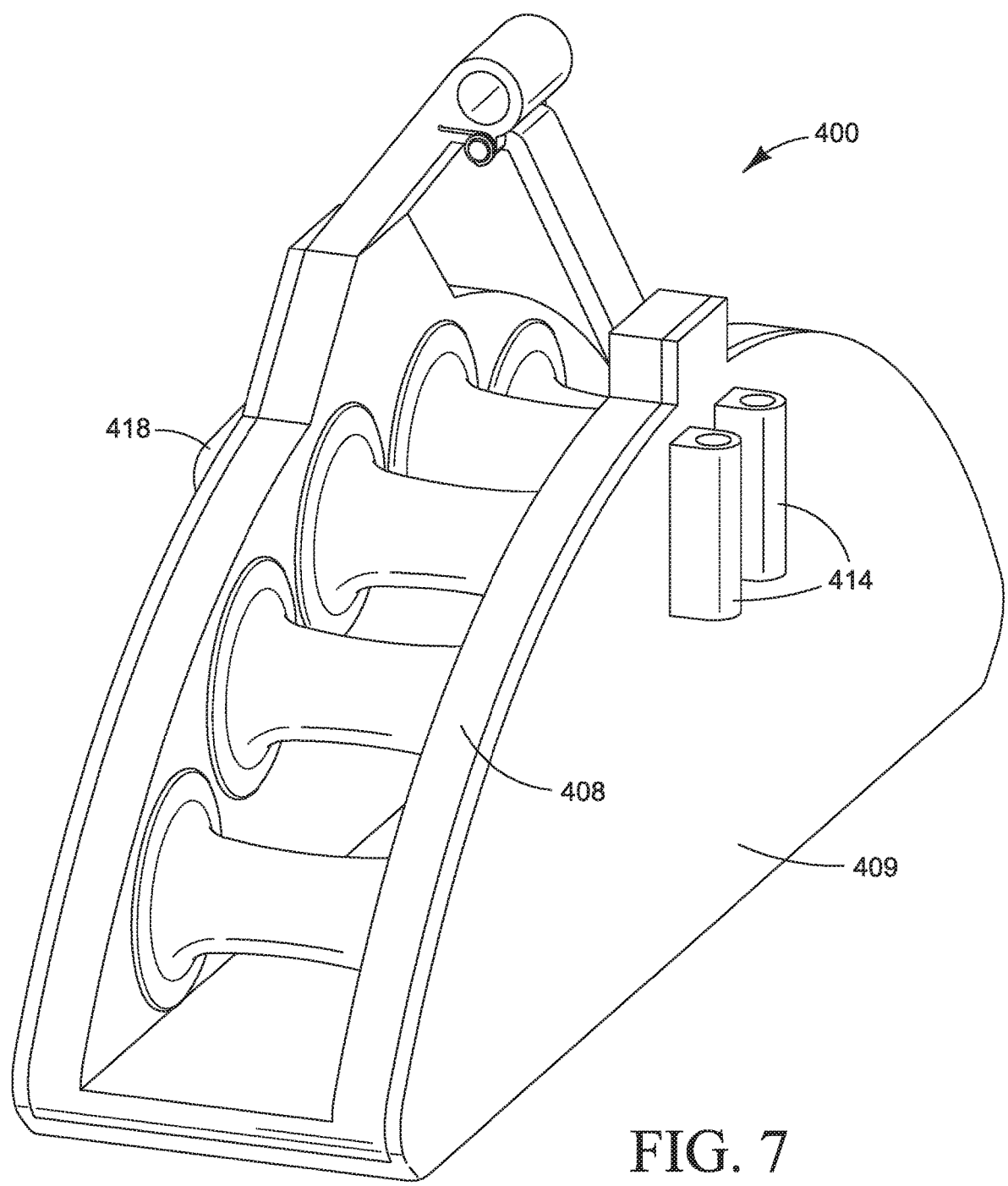
FIG. 7 is a top perspective view of an embodiment of the aggregation roller.

The first side 108 of the main body 101 of the aggregation roller 100 can be a nonconductive material, such as a ultra high molecular weight (UHMW) plastic non-conductive material, however other materials are hereby contemplated, including, but not limited to, other plastic, poly-vinyl chloride (PVC), carbon fiber coated in nonconductive material, fiberglass, etc, although in a more likely embodiment the main body is a conductive material enveloped either fully or partially by a nonconductive layer, as shown in FIG. 7, to prevent electrocution of the lineman when the aggregation roller 100 is nearby a charged conductor.

The plurality of first couplings 102 are preferably a hex screw, however other types of couplings are hereby contemplated, including, but not limited to, flat socket flat head screw, socket head screw, etc. The plurality of first screws 102 are useful for securing a plurality of rollers 201 coupled to the interior 200 of the aggregation roller 100.

A first side 108 of body 101 of the aggregation roller 100 has channels 114 configured to attach to a helicopter guide arm 120. The helicopter guide arm 120 is configured for allowing a user to drop guide the aggregation roller 100 into position by a helicopter, crane, or other drop stringing apparatus. The helicopter guide arm 120 is preferably constructed from a fiberglass material. The helicopter guide arm can be a single structure, as illustrated in FIG. 1, or multiple guide arms.

The interior 200 of the aggregation roller 100 is coupled between the first side 108 of the main body 101 of the aggregation roller 100 and the second side 114 of the main body 101 of the aggregation roller 100 forming a groove or channel 107. The bottom 104 of the main body 101 is configured to attach to a base for positioning on a cross arm or utility pole. In the depicted embodiment a flange 117 having a pin hole is connected to the bottom of the roller body.

The second side 114 of the body 101 of the aggregation roller 100 attaches a side flange 118. The side flange 118 is configured to couple to a connector of a base (illustrated in U.S. patent application Ser. Nos. 16/595,447 and 16/719,800) for mounting on a utility pole or cross beam.

Figure 4:
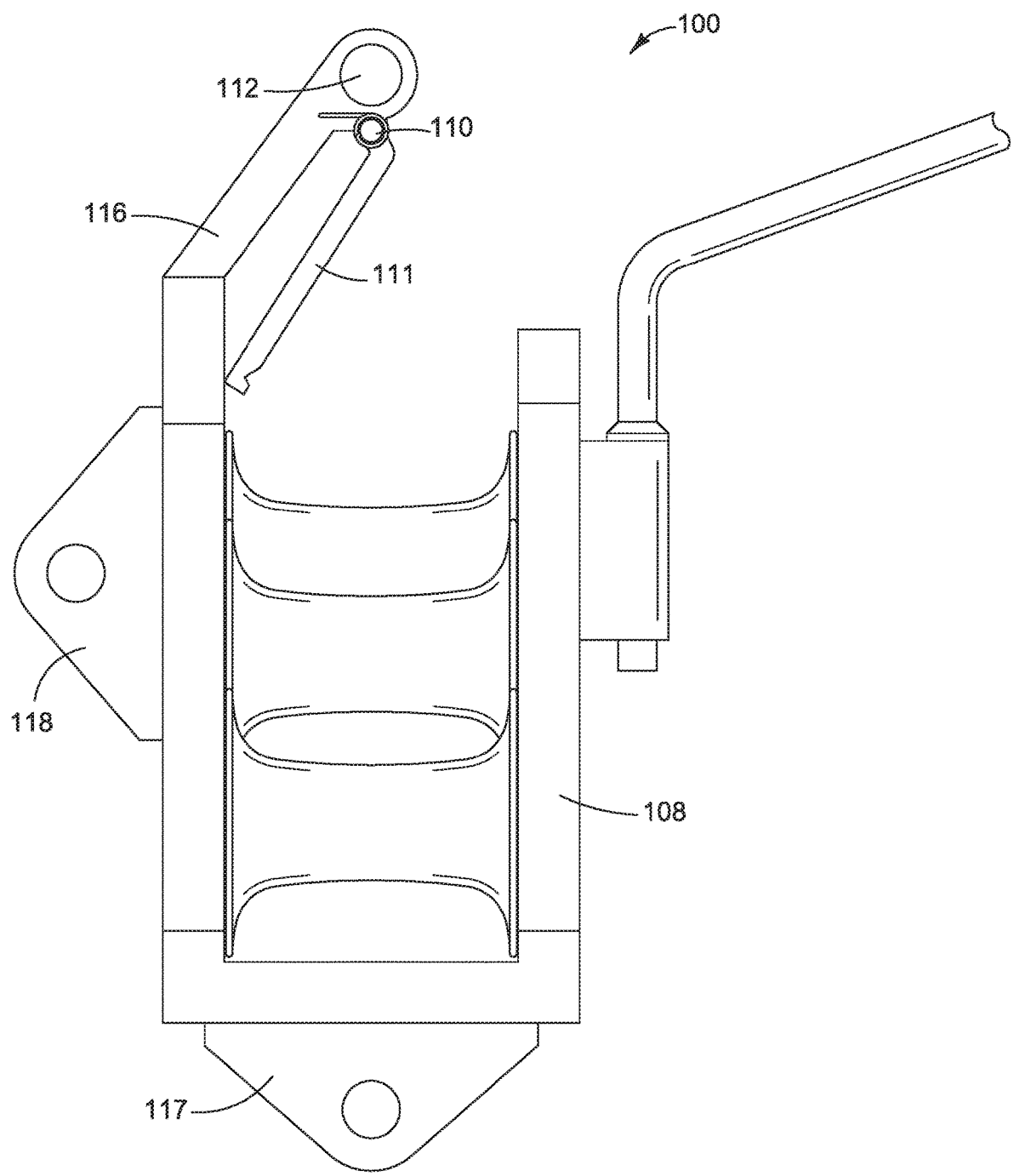
FIG. 4 is a front view of an embodiment of the aggregation roller shown in FIG. 1 with the gate open.
Figure 5:
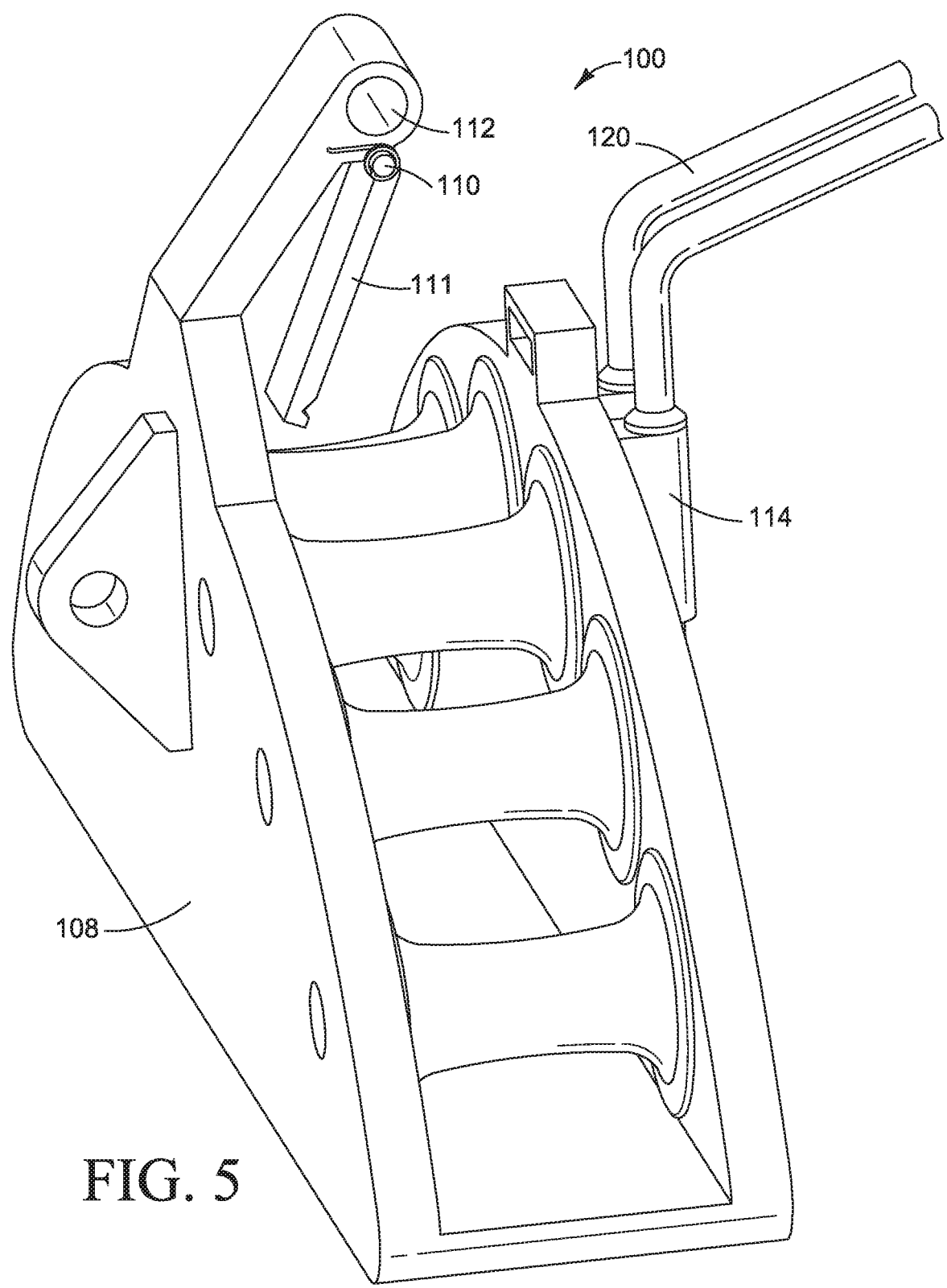
FIG. 5 is a top perspective view of an embodiment of the aggregation roller shown in FIG. 1 with the gate open.
Figure 6:
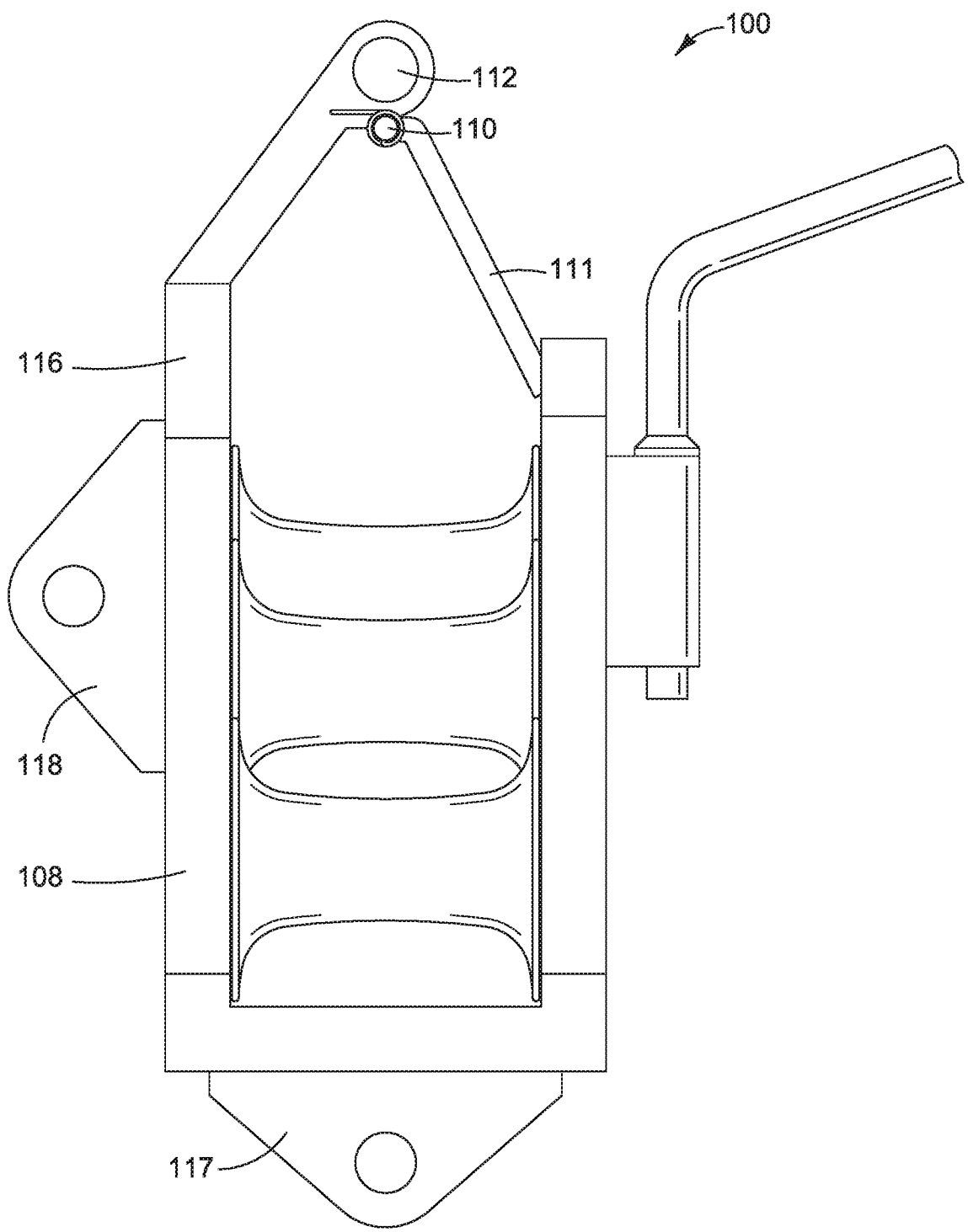
FIG. 6 is a front view of an embodiment of the aggregation roller shown in FIG. 1 with the gate closed.

FIGS. 4-6 illustrate the opening and closing of the gate 111. The gate 111 is configured to open and close preferably with a spring loaded hinge 110. The gate 111 is configured to push open when a conductor is inserted into the interior 200 of the aggregation roller 100. The hinge 110 is then configured close the gate 111 (illustrated in FIG. 6) when pressure is released, securing a rope or cable into the aggregation roller 100.

FIG. 7 illustrates another embodiment of an aggregation roller 400. The aggregation roller 400 has an outer body 409 configured to envelop a main body 408. The main body 408 is preferably a conductive material and the outer body 409 is preferably a nonconductive material. The outer body 409 is preferably a single piece enveloping the main layer 408. Alternatively, the outer body can be multiple pieces constructed to envelop the main body. The guide channels 414 and flanges 418 (bottom flange not shown) attach to the outer layer 409. Alternatively, the guide channels 414 and flanges 418 (bottom flange not shown) can be integrated with the main body 408 and the outer body 409 covers around the guide channels 414 and flanges.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

While certain exemplary embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. An aggregation roller for stringing a conductor over a span, the roller comprising:
a main body, said main body having a first side and a second side and a bottom side, wherein said bottom side is generally flat and said first side and said second side extending away from said bottom in a generally arcuate shape, wherein said body defining an interior, wherein said interior comprising a plurality of rollers positioned in said interior and extending from said first side of said main body to said second side of said main body, wherein said rollers are positioned in said interior in an arcuate shape generally following the arcuate shape of said first side and said second side;
wherein between said first side and said second side and said plurality of rollers defining a groove configured for receiving a length of a power conductive line;
a extension arm extending generally vertically from said second side of said main body to a point generally above a center of said channel defined by said rollers, wherein a gate attached to said extension arm and extends to said first side, wherein said gate is configured to open inwardly when pressure is applied to said gate, wherein said gate is configured to bias closed when pressure is relieved from said arm.

2. The roller of claim 1, wherein a first flange extends from said bottom side of said main body, said first flange configured for mating engagement with a base configured for mounting to a crossarm.

3. The roller of claim 1, wherein a second flange attaches to said second side of said main body, wherein said second flange is configured for mating engagement with a base.

4. The roller of claim 1, wherein the main body comprising a non-conductive material.

5. The roller of claim 1, wherein a helicopter guide arm attaches to said first side of said main body.

6. The roller of claim 1, wherein the gate being a spring-loaded gate.

7. The roller of claim 1, wherein said extension arm defines a rigging hole, wherein said rigging hole is configured for hanging application.

8. The roller of claim 1, wherein said main body further comprises an outer body, wherein said outer body is configured for enveloping said main body's exterior, wherein said outer body comprise a nonconductive material.

9. The roller of claim 1, wherein the plurality of rollers being made of a urethane material.

10. The roller of claim 9, wherein the plurality of rollers being coated with a non-conductive polyurethane.

11. The roller of claim 1, wherein the plurality of rollers being a number of six.

12. The roller of claim 1, wherein said plurality of rollers comprise bearings.

\* \* \* \* \*